March 5, 1935.  S. BELLER  1,993,355

BREAD BAND

Original Filed June 25, 1932

Inventor
Samuel Beller
by Harold E. Cole
Attorney

Patented Mar. 5, 1935

1,993,355

UNITED STATES PATENT OFFICE 1,993,355

BREAD BAND

Samuel Beller, Waltham, Mass., assignor to O. B. Andrews Company, Chattanooga, Tenn., a corporation of Tennessee Refiled for abandoned application Serial No. 619,349, June 25, 1932. This application October 31, 1934, Serial No. 750,870

1 Claim. (Cl. 24—17)

This application is a substitute for my application Serial No. 619,349, filed June 25, 1932, now abandoned.

This invention relates to a bread band, and more particularly to a band for holding a loaf of bread together after it is sliced.

The common practice of today in packaging a loaf of bread after slicing it is to put the sliced loaf in a container which consists of a bottom and four low sides. There is difficulty often in placing the sliced loaf into the container as it is a fairly close fit, especially when the slices do not stay in alinement. Recognizing the shortcomings of the present container it has been my purpose to provide a new means in the form of a band for holding a sliced loaf of bread which will embody all the advantages of the container and be simpler and quicker to use.

One object of my invention is to provide a band for a loaf of bread, especially one which has been cut into slices, that can be stamped from one piece of material at one operation. Another object is to provide a band that may instantly be placed around a sliced loaf of bread and fastened tightly enough to hold the slices in upright position. Still another object is to have such a band attractive in appearance.

The foregoing and other objects which will appear as the nature of the invention is better understood, may be accomplished by a formation such as is disclosed by the drawing. The nature of the invention is such as to render it susceptible to various changes and modifications, and, therefore, I am not to be limited to the formation disclosed by the drawing; but am entitled to all such changes therefrom as fall within the scope of my claim.

Figure 1:
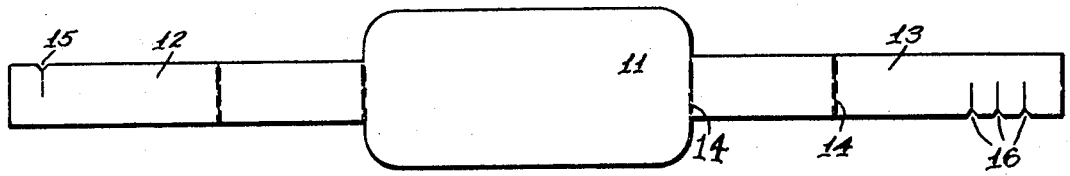
Figure 1 is a plan view of my bread band, the whole being laid out flat.
Figure 2:
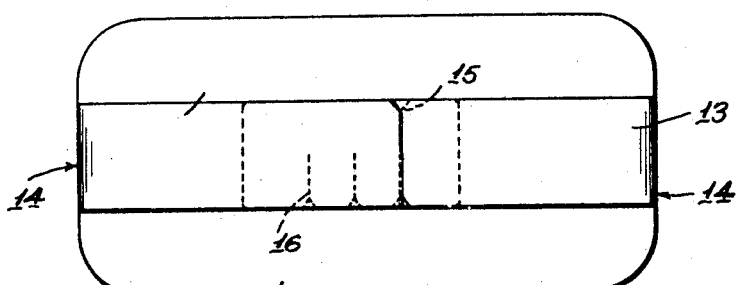
Figure 2 is a plan view showing my bread band in closed position.
Figure 3:
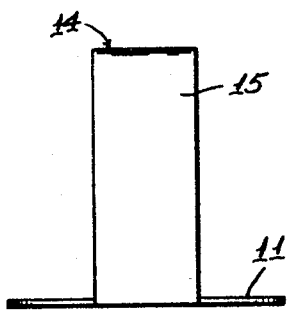
Figure 3 is an end elevation of my bread band in closed position.
Figure 4:
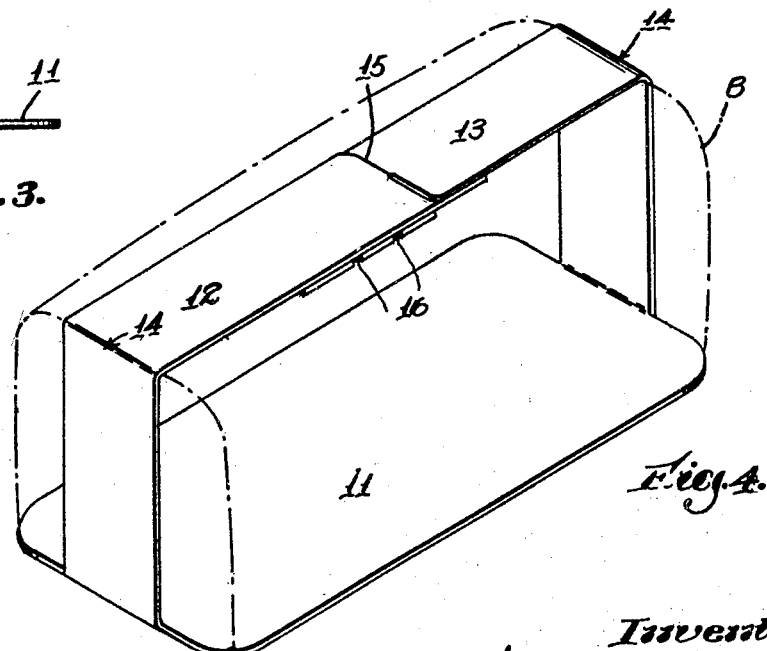
Figure 4 is a perspective view of my bread band fastened around a loaf of sliced bread, the bread being indicated by broken lines.

As illustrated, my bread band, as shown in Figure 1 of the drawing, is formed of one piece of inexpensive material, such as paper or cardboard, being stamped out, scored and slit in one operation. It has a bottom 11 and arms 12 and 13 which are preferably scored as at 14 so the arms may more readily fold around the loaf of bread B. In one of said arms 12 a slit 15 is cut near the end, while in the other said arm 13 a plurality of slits 16 are cut from a point near the end and extending inwardly. Said slits 15 and 16 each have an opening or mouth portion at their outside edge which makes it easier to interlock the arms at the slit.

After the loaf has been sliced the portion of the arm 12 at the slit 15 is pushed under the other arm 13 and into one of the slits 16, which closes and locks the band around the loaf of bread, holding the whole upright. As the loaves vary in size there are a number of slits 16 provided in the arm 13 so that the holder may be tightly closed over the loaf of any common size, by pushing the slit end portion of the arm 12 into whichever one of the slits 16 makes the tightest fit.

It will be seen from the foregoing description that one of the great advantages in the formation of my band is that all parts and features are stamped out and formed of a single piece of material at one time, thereby making it possible to provide a most effective and usable band at a very low cost.

What I claim is:

A bread band formed from a single piece of material capable of being laid out flat, and as so laid out comprising a bottom, two arms substantially narrower than said bottom, each of said arms extending from said bottom in opposite directions to each other and having two scored portions therein, one said scored portion being at the point of juncture between said bottom and a said arm and the other scored portion being spaced away from said first-mentioned scored portion, one of said arms having a slit extending but part way across and near its outside end, the other of said arms having a plurality of slits near its outside end extending but part way across, said arms having a cut-away portion on each side of each said slit extending diagonally from the outside edge of said arm towards and meeting said slit at a point a slight distance in from said outside edge.

SAM BELLER.